Figure 1:
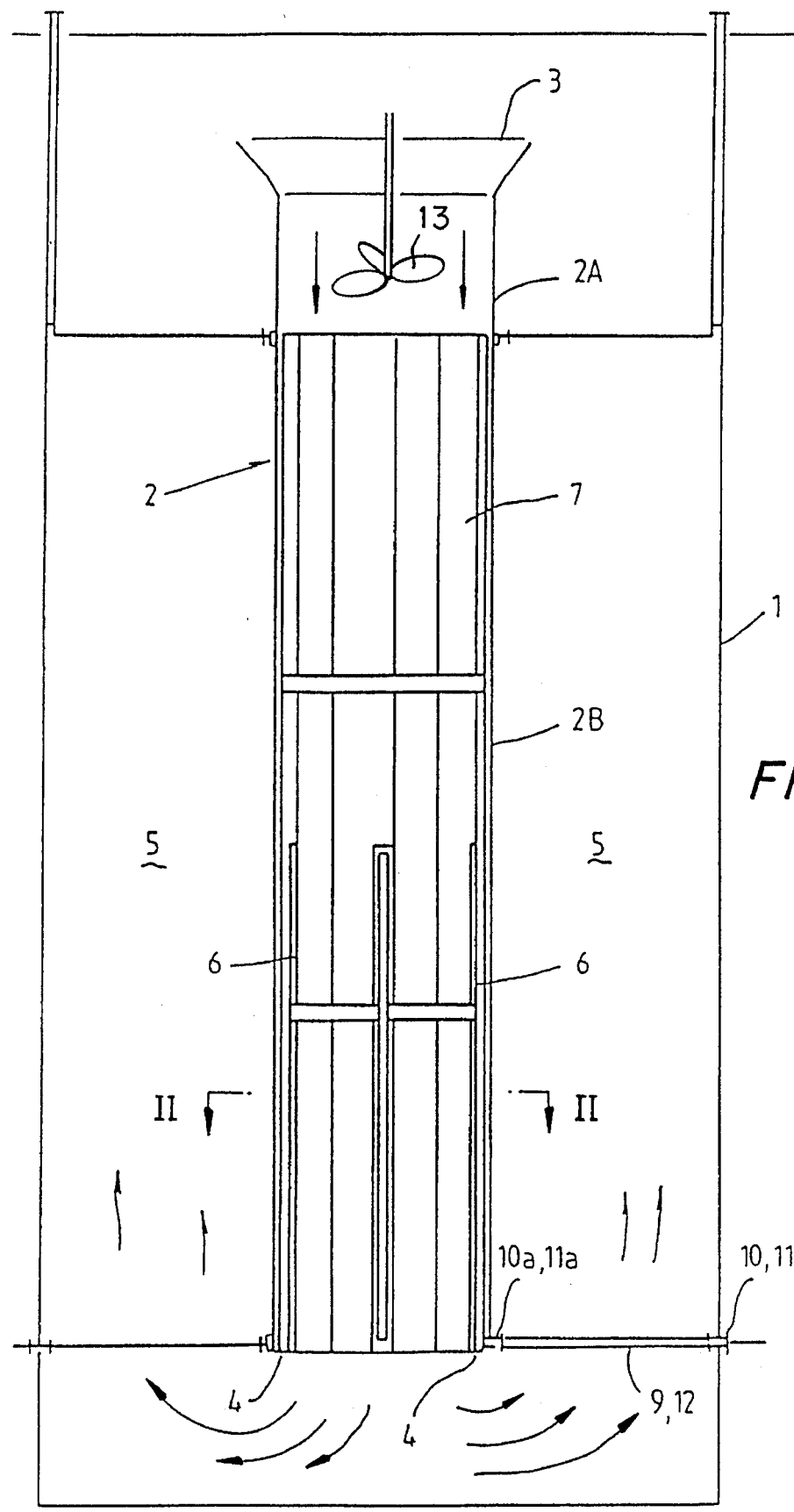

United States Patent [19]

Wood et al.

[11] Patent Number: 5,503,220

[45] Date of Patent: Apr. 2, 1996

[54] HEATING AND/OR COOLING OF VESSELS

[75] Inventors: David G. Wood, Queensland; Anthony J. Crisp, Victoria; Arthur J. Bursle, Queensland, all of Australia

[73] Assignee: Comalco Aluminium Limited, Victoria, Australia

[21] Appl. No.: 84,182

[22] PCT Filed: Jan. 6, 1992

[86] PCT No.: PCT/AU92/00005

§ 371 Date: Nov. 3, 1993

§ 102(e) Date: Nov. 3, 1993

[87] PCT Pub. No.: WO92/12392

PCT Pub. Date: Jul. 23, 1992

[30] Foreign Application Priority Data

Jan. 7, 1991 [AU] Australia .................................. PK4123

[51] Int. Cl.$^6$ .............................. F28D 1/02; F28D 21/00; B01F 15/06; B01F 7/16
[52] U.S. Cl. .................... 165/108; 165/109.1; 366/147; 422/227; 422/201
[58] Field of Search ................................. 165/108, 109.1; 366/147; 422/227, 201

[56] References Cited

U.S. PATENT DOCUMENTS

| | | | |
|---|---|---|---|
| 3,193,361 | 7/1965 | Niedner | 165/109.1 |
| 3,400,051 | 9/1968 | Hofschneider | 165/109.1 |
| 3,517,732 | 6/1970 | Brebant | 165/109.1 |
| 3,962,042 | 6/1976 | Malick | 195/143 |
| 4,304,753 | 12/1981 | Klaren | 422/140 |

FOREIGN PATENT DOCUMENTS

| | | |
|---|---|---|
| 25855 | 10/1984 | Australia . |
| 76348 | 1/1992 | Australia . |
| 896323 | 7/1983 | Belgium . |
| 900298 | 2/1985 | Belgium . |
| 1619777 | 3/1971 | Germany . |
| 3432864 | 9/1984 | Germany . |
| 2004 | 6/1982 | WIPO .................................. 366/147 |

OTHER PUBLICATIONS

Shaw, John A. "The Design of Draft Tube Circulators", Proc. Australas. Inst. Min. Metall. No. 283, Sep. 1982 pp. 47–58.

Japan Utility Model No. Sho 60–18415 (Nippon Light Metals Co., Ltd.), Jun. 1985.

*Primary Examiner*—John K. Ford
*Attorney, Agent, or Firm*—Nikaido, Marmelstein, Murray & Oram

[57] ABSTRACT

An apparatus for heating or cooling solid suspension slurry. The apparatus comprises a vessel (1) for containing the slurry and a draft means contained within a draft section of a draft tube (2) to circulate and maintain the suspension. Extending substantially the length of cylindrical section (26) of the draft tube below the draft means are plate heat exchangers (7, 21, 23, 25, 27, 29) connected in series. The plate heat exchangers may be recessed into the wall of the draft tube so as not to increase the pressure drop through the draft tube or may be arranged in pairs along the axis of the draft tube so that the proportion of the cross-sectional area of the draft tube occupied by the heat exchangers is minimized.

2 Claims, 7 Drawing Sheets

HEATING AND/OR COOLING OF VESSELS

FIELD OF THE INVENTION

This invention relates to the heating and/or cooling of vessels and in particular vessels which are agitated by a draft tube.

Vessels containing slurries must be agitated to prevent settling of the solid phase. This is frequently achieved by pumping the slurry up or down a draft tube.

In addition to agitation, temperature sensitive processes require a heat source or sink to regulate the temperature by cooling or heating the process slurry. For example, in a multi-stage precipitation process which utilises a series of vessels known as precipitation tanks, it is necessary to maintain the process liquor in a state of a super-saturation so that precipitate will continuously form onto seed crystals. To maintain the process liquor in each stage at a supersaturated state, heat must be continually removed from the slurry as it moves downstream.

In small scale operations heat loss due to radiation and convection from the surface of the vessels is sufficient to propagate the precipitation process without resulting in excessive residence times. However, in large scale operations, such as those found in commercial plants using the Bayer process for the precipitation of alumina hydrate from bauxite, total reliance on radiation and convection from the surfaces of the precipitation tanks to achieve any substantial overall temperature drop results in a high residence time for the process and consequently a large number of tanks. For a typical commercial size vessel of about 4 million liters, heat loss based on radiation and convection, although dependent on atmospheric conditions, is typically 0.5° C. to 1.0° C. per vessel. Thus at a temperature drop from 80° C. to 50° C., about forty vessels are required.

Description and Related Art

While the slow cooling rate has many process advantages, the temperature drop per vessel due to radiation and convection losses is low resulting in high capital expenditure. As a compromise, it has become normal practice to rely on interstage cooling in the precipitation circuit, to decrease the number of tanks. In interstage cooling the process slurry is cooled between stages of the precipitation circuit in an external cooling system by flash cooling or in a heat exchanger.

Conventionally, commercially operating interstage cooling systems provide cooling of the process slurry by 5° C. to 15° C. at only two to three selected points in the precipitation circuit. However, the temperature profile achieved in precipitation processes with temperature drops of this magnitude are far from optimum, resulting in loss of yield and inferior product quality.

To maintain a high level of control over the quality and yield of precipitate forming, it is desirable to have a control over the temperature drop between each stage and the cooling rate within each stage. However, if conventional cooling were used in this manner, the capital cost of the additional pumping system and the heat exchangers would be substantial.

Disclosure of the Invention

It is an objective of the present invention to provide an apparatus for heating or cooling material in a process vessel which is agitated by a draft tube.

The invention provides an apparatus for heating or cooling a particulate suspension in a process vessel comprising a draft tube having a draft section and an elongate cylindrical section, a means in said draft section for circulating suspension through said draft tube at a velocity sufficient to substantially maintain the particulate suspension in the vessel, and a heat exchange means in a substantial length of said cylindrical section of said draft tube to remove or supply heat to the suspension circulating through the tube, thereby cooling or heating the suspension in the vessel.

As discussed earlier, to prevent settling of a solid phase in a process vessel, slurry is pumped through the draft tube at high velocities typically in excess of 1 meter per second. In many cases the velocity is sufficiently high to provide turbulent conditions in the draft tube. The applicant has determined that if a heat transfer surface is placed in a stream of this velocity, efficient heat transfer conditions are present.

By providing heat exchange means in the cylindrical section of the draft tube, the invention takes advantage of the high velocity flow and consequent favourable heat transfer conditions on the slurry side of the heat transfer surface. The provision of the heat exchange means over a substantial length of the cylindrical section of the draft tube allows the duty of the heat exchanger means to be removed or supplied over as large an area as possible without affecting the overall temperature drop or increase of the vessel. Consequently the rate of cooling or heating of the process liquor is slower than if all of the duty were removed over a smaller area. The slower rate of cooling or heating is highly desirable in processes such as the cooling of supersaturated process liquors.

Preferably the heat exchange means is an arcuate heat exchanger which is shaped to conform to the contours of the inner wall of the cylindrical section of the draft tube. The arcuate heat exchanger may be a plurality of heat exchange plates-connected in series and recessed into the inner wall draft tube so as not to restrict the flow through said draft tube.

In another form, the heat exchange means may be two or more plate heat exchangers positioned within the passage of flow in the draft tube. When a plurality of plate heat exchangers are used, said exchangers may be spaced in pairs axially along the length of the draft tube such that successive axially spaced exchangers are at right angles. The axially spaced exchangers are preferably connected in series to each other and successive axially spaced exchangers.

The heat transfer fluid may be water or it may be any appropriate process stream.

BRIEF DESCRIPTION OF THE DRAWINGS AND PREFERRED EMBODIMENT

Figure 2:
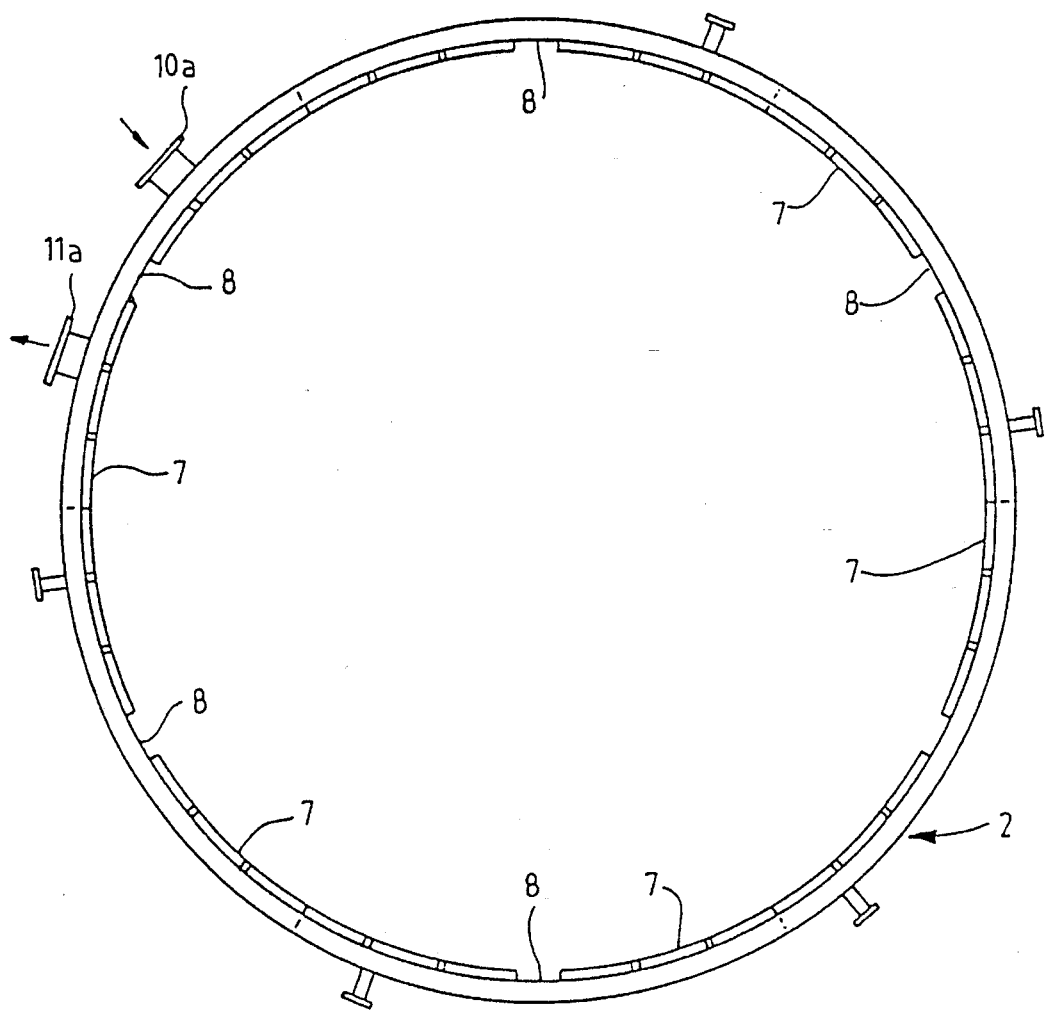
Figure 3:
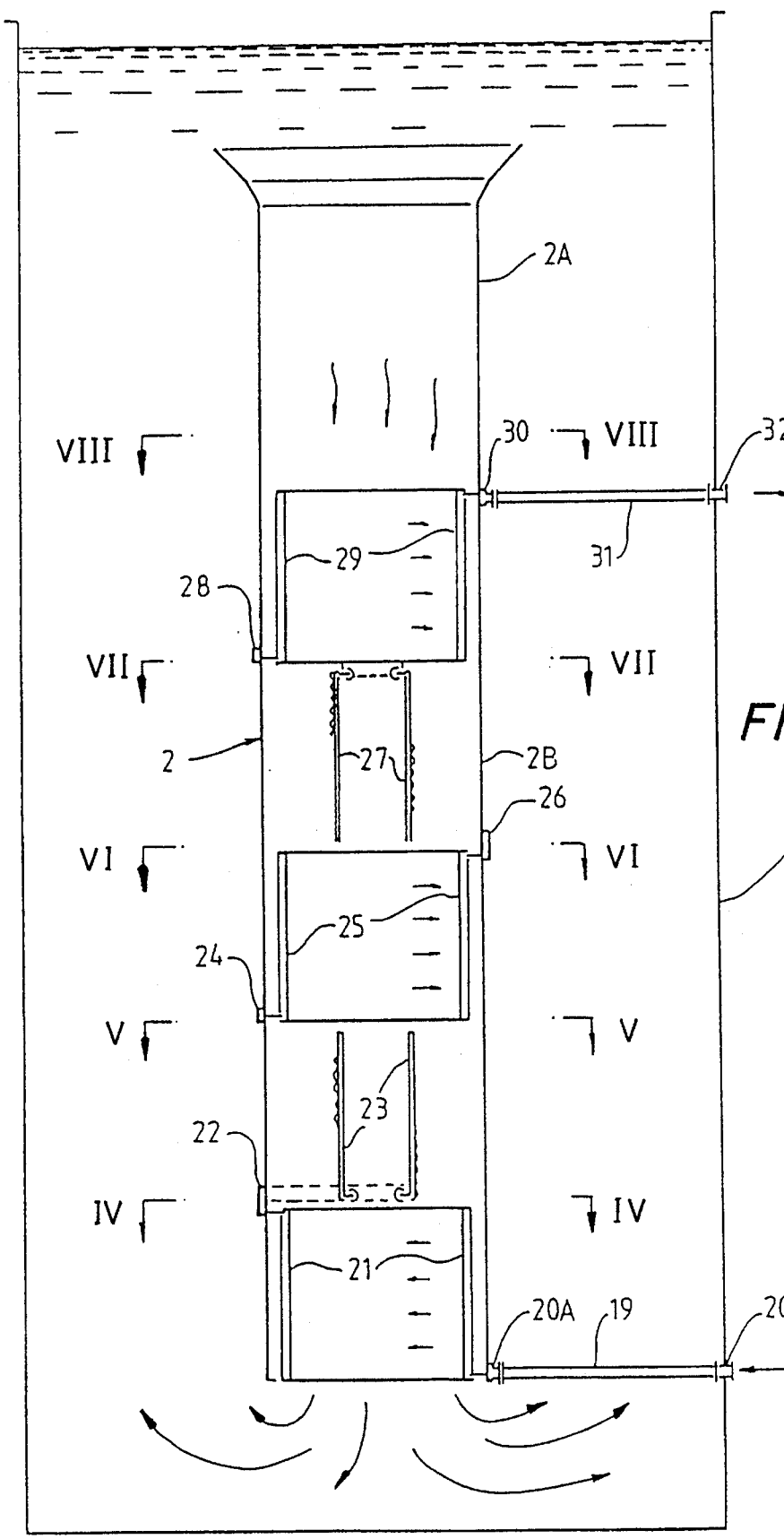
Figure 4:
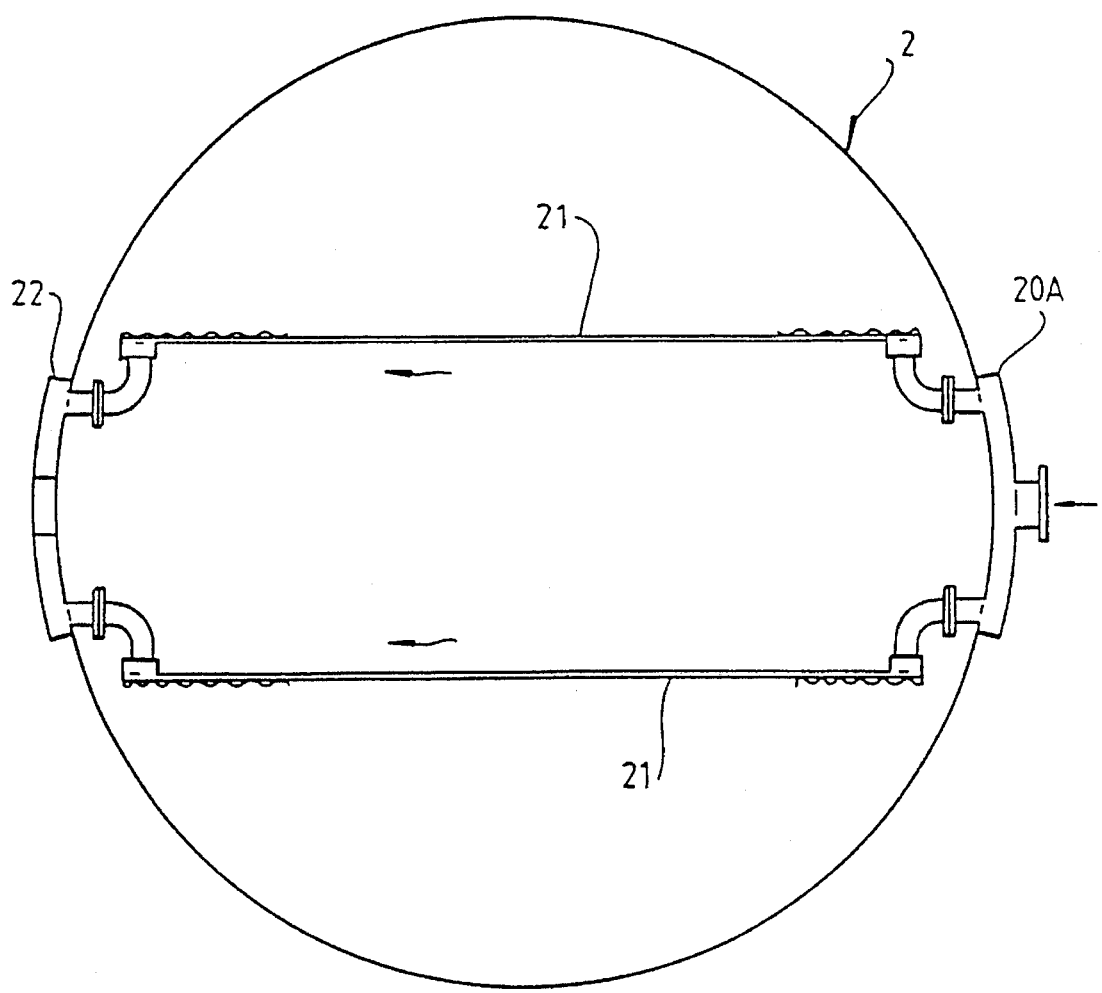
Figure 5:
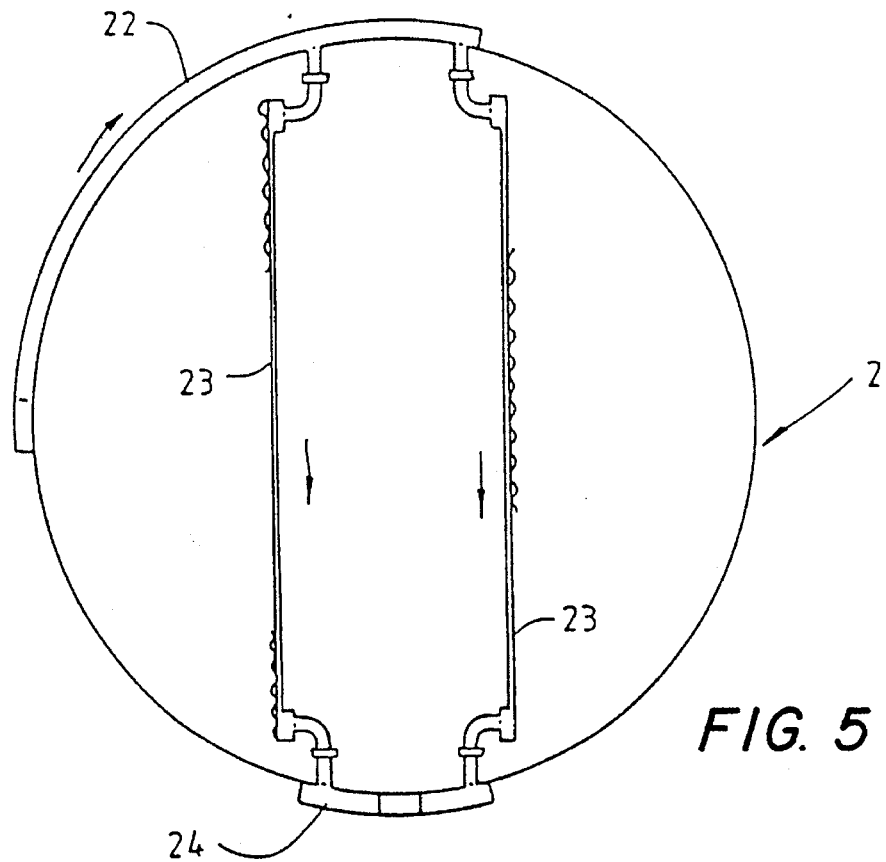
Figure 6:
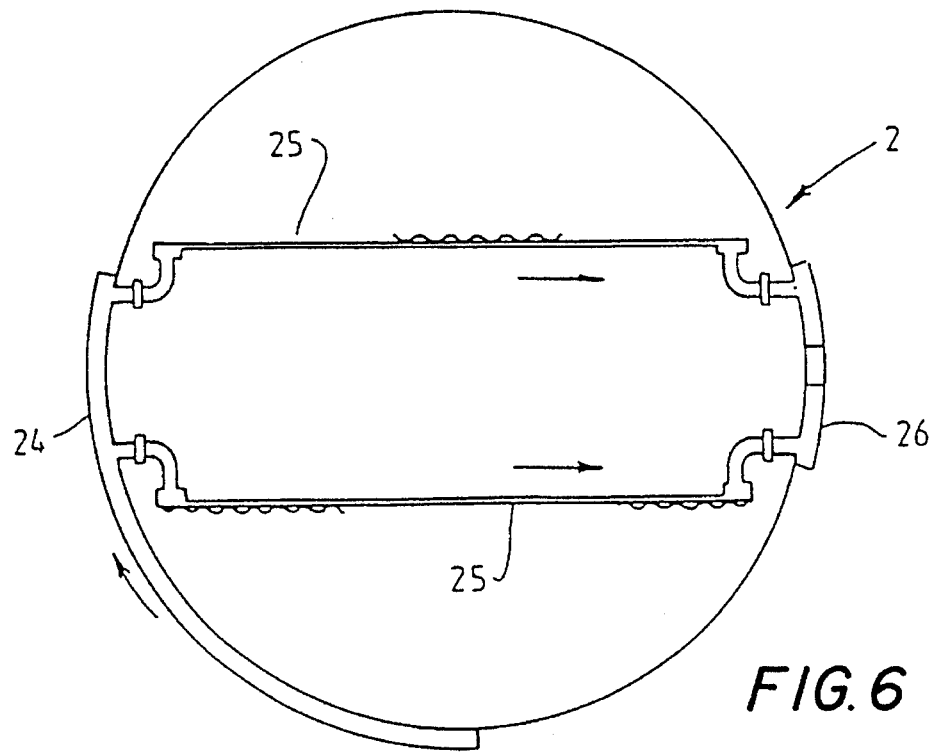
Figure 7:
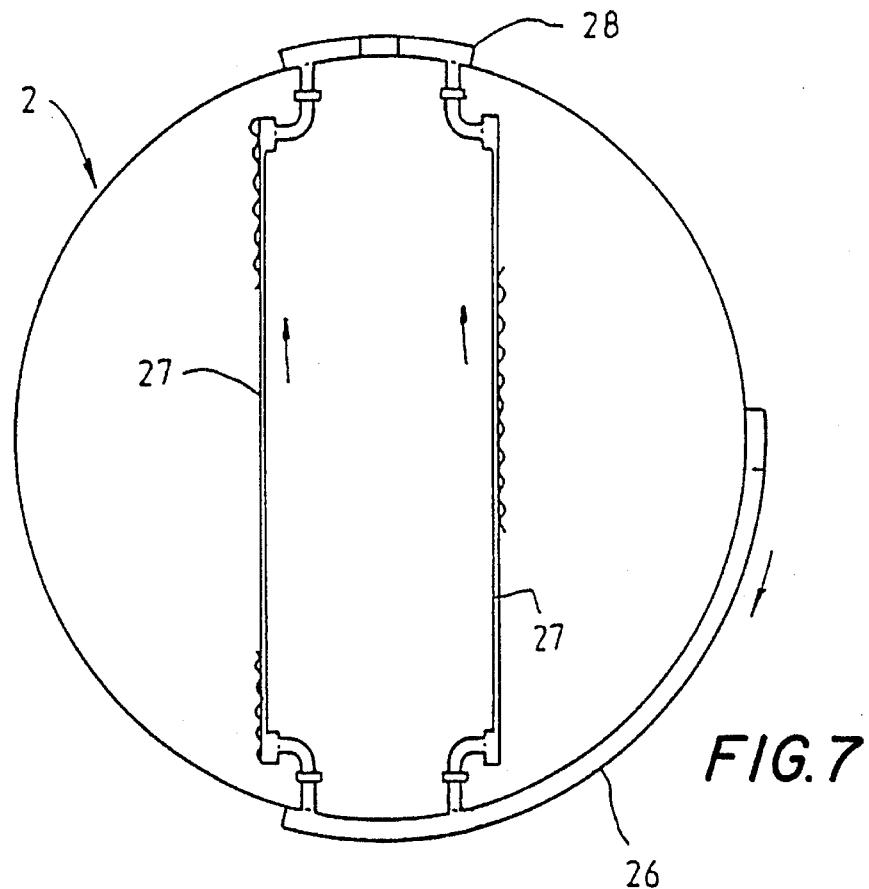
Figure 8:
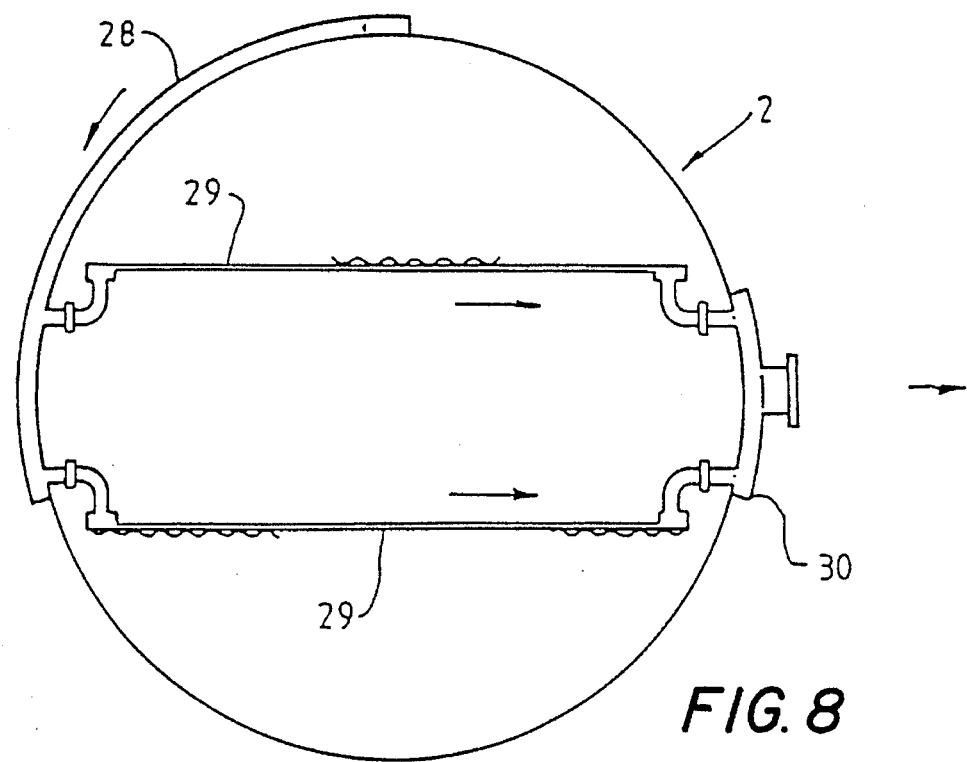

The foregoing and other features objects and advantages of the invention will become more apparent from the following description of the preferred embodiment and accompanying drawings in which:

FIG. 1 is a sectional elevational view of a vessel featuring an embodiment of the invention, FIG. 2 is a sectional view of the embodiment of FIG. 1 through Section A/-, FIG. 3 is a sectional elevational view of a vessel illustrating a second embodiment of the invention, FIG. 4 is a sectional view (not to scale) of the second embodiment through Section A/- of FIG. 3, FIG. 5 is a sectional view of the second embodiment through Section B/- of FIG. 3, FIG. 6 is a sectional view of the second embodiment through Section C/- of FIG. 3, FIG. 7 is a sectional view of the second embodiment through Section D/- of FIG. 3, and FIG. 8 is a sectional view of the second embodiment through Section E/- of FIG. 3.

Figure 9:
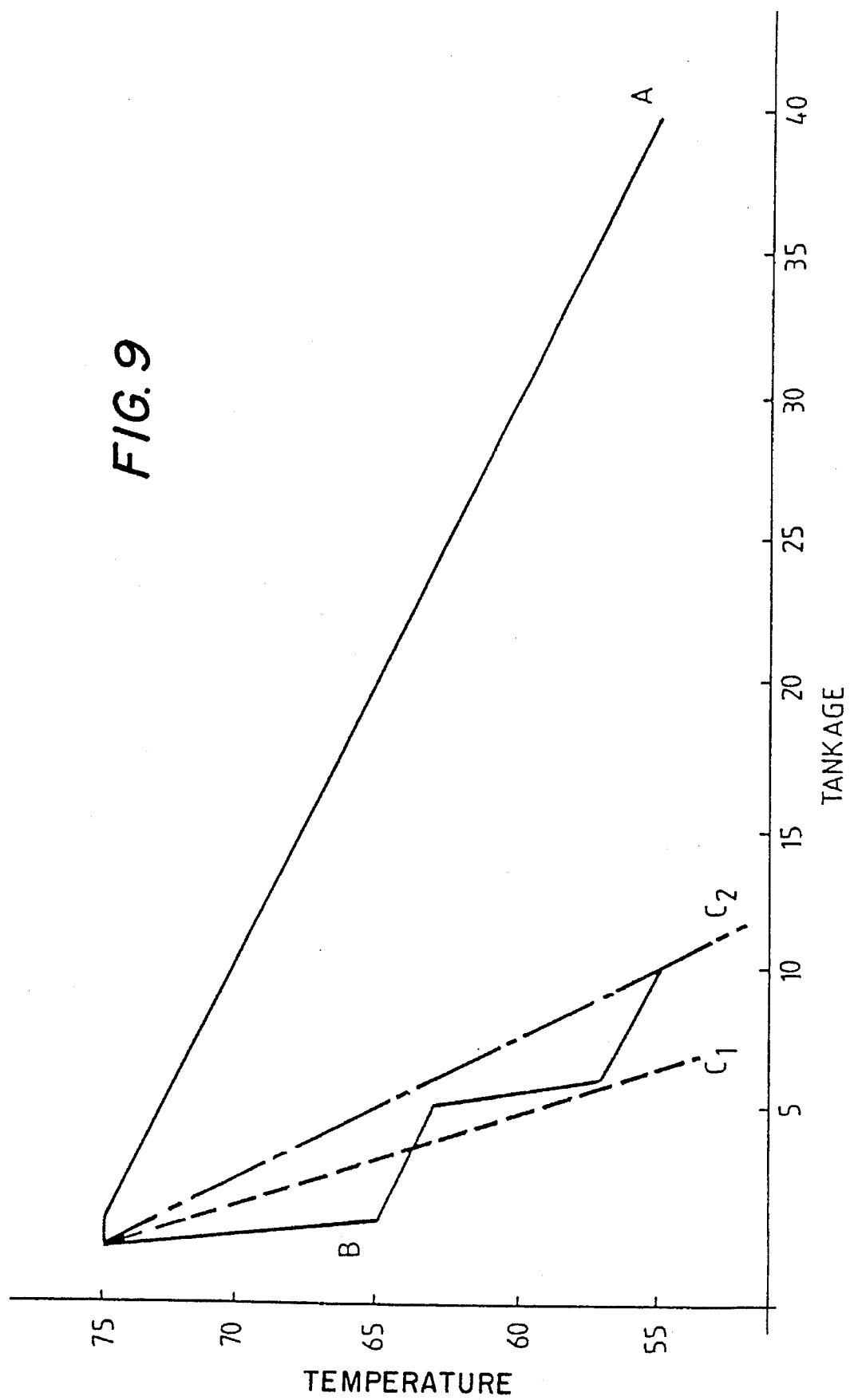

FIG. 9 is a diagrammatic representation of results tabulated in Table 1.

Referring to FIG. 1, the slurry in vessel 1 is agitated by a conventional draft tube 2 having a draft section 2A and an elongate cylindrical section 2B. The slurry enters through the opening 3 in the draft section A at the top of the draft tube 2 and is accelerated within the draft tube by a draft means such as an impeller 13.

The slurry then passes through the elongate cylindrical section 2B of the tube and exits the bottom of the tube and creates an up-draft in the slurry in the annular region 5 of the vessel 1. Therefore to maintain the slurry as a suspension the velocity of the slurry in the draft tube 2 should be sufficiently high to create the necessary up-draft. In a typical Bayer process precipitation vessel the velocity of the slurry through the draft tube is between about 1 meter per second and 2 meters per second. In the event of a draft tube blockage, due to for example power failure, the typical draft tube is provided with resuspension slots 6 which enable resuspension of the solids. The operation of such slots would be well known to those skilled in the art.

In the Bayer process and the precipitation from supersaturated liquors in general, a slow cooling rate reduces the probability of nucleation and the consequent production of excess fine hydrate or precipitate.

In the embodiment of the invention shown in FIG. 1, a heat exchanger 7 is fitted to the internal surface of the cylindrical section of the draft tube. For a predetermined temperature drop from one vessel to the next, the heat exchanger has a required heat exchange duty. Thus to ensure that the incremental cooling rate of the slurry which is in contact with the heat exchange surface is as low as possible, the heat exchange surface extends over a large proportion of the internal surface area to provide the maximum contact between the heat exchange surface and the slurry. As the draft section 2A of the draft tube 2 at the top of the draft tube has a draft means incorporated into it, there is a practical limitation on the height of the heat exchange surface. This practical limitation allows the heat exchange surface to extend up to and just below the draft means. By providing a heat exchange surface over substantially the entire internal circumference of the cylindrical section of the draft tube, the area over which the heat is transferred to the heat exchanger is maximised.

To allow the resuspension slots to perform their function, the heat exchanger 7 is shaped with inserts 8 as shown in FIG. 2 to fit around the slots.

As the velocity of the slurry in the draft tube is typically in excess of 1 meter per second, turbulent conditions are provided within the cylindrical section 2B of the draft tube which allows excellent heat exchange conditions to exist.

In the embodiment of FIG. 1, the heat exchanger comprises a plurality of plate heat exchangers recessed into the wall of the cylindrical section 2B of the draft tube 2. This ensures that the placement of the heat exchangers results in a minimal increase in the pressure drop through the draft tube 2. Coolant such as water or any other suitable process stream is fed via inlet 10 and conduit 9 into exchanger inlet 10a. The coolant then passes through each plate heat exchanger in series before being removed from exchanger outlet 11 by conduit 12 and outlet 11.

The plate heat exchange surfaces may be made from any known material which resists corrosion and abrasion attack from the solids and liquids in the slurry and cleaning fluids.

In a second preferred embodiment shown in FIG. 3, the heat exchange means comprise pairs of plate heat exchangers positioned about the axis of the draft tube 2 positioned in a vessel 1 as shown in FIG. 1. The pairs of heat exchangers are preferably double side, connected in series and stacked vertically in the draft tube 2. The pairs of heat exchanger surfaces are stacked to provide cooling or heating over a substantial length of the draft tube 2 thereby providing a progressive transfer of heat from the slurry as it passes through the draft tube 2.

As shown in FIG. 4, coolant is fed to the first pair 21 in the series of heat exchangers via inlet 20, conduit 19 and exchanger inlet 20a from an external source (not shown). The coolant is collected in a coolant transfer channel 22 which extends around the draft tube 2, and is then fed to heat exchangers 23 as shown in FIG. 5. The coolant flows through heat exchangers 23 in the direction shown and into a second coolant transfer channel 24 which extends around the draft tube 2.

As shown in FIG. 6, the second transfer channel 24 feeds heat exchanger 25 and coolant flows in the direction of arrows to the third coolant transfer channel 26. Similarly, coolant flows through channel 26, heat exchangers 27, fourth coolant transfer channel 28, heat exchanger 29 to exchanger outlet 30 as shown in FIGS. 7 to 8 then flows beyond the boundary of the vessel via conduit 31 and outlet 32.

As any increase in the pressure drop through the draft tube results in a corresponding increase in the energy consumption of the draft means, it is important, 2stalkedin this embodiment, that the heat exchange plates are positioned to minimize any pressure drop increase. Thus the heat exchange plates are arranged in stacked pairs to minimize the cross-sectional area of the draft tube occupied by the plates and limit the associated pressure drop increase.

It is preferred that the plate heat exchanger occupy no more than 2% of the internal cross-sectional area of the draft tube. Furthermore, as the inclusion of heat exchange plates in accordance with the embodiment of FIGS. 3–8 of the present invention results in a reduction in cross-sectional area of not more than 2%, the energy requirements of the draft means to maintain the circulation rate of the suspension is not greatly increased and is of the order of not more than 1%.

As would be apparent to those skilled in the art, the invention in accordance with FIGS. 1 or 2 does not intrude into the flow path of the circulating suspension and consequently results in a negligible increase in energy consumption of the draft means.

Either of the above heat exchanger arrangements are preferably inserted into the draft tube 2 to provide cooling or heating to the circulating slurry.

An application which demonstrates the usefulness of the present invention is the cooling of precipitation vessel in the Bayer process for precipitation of alumina trihydrate from caustic soda solution. As discussed earlier, it is desirable to cool the super saturated or pregnant liquor by incremental changes in the vessel temperature in the precipitation circuit. This allows control of the precipitation process and subsequent precipitate product, without requiring a large number of tanks.

For a precipitation vessel of 14 meters internal diameter, liquid height of 29 meters and a draft tube of 4.4 meters internal diameter, a slurry velocity of 1.22 –1.28 meters per second is typically used. The draft tube is about 25 meters in length, of which 5 meters is the draft section 2a.

Either of the heat exchange configurations fitted to the draft tube removes of the order of 8,000 to 9,000 kcal per pass of slurry. For this amount of heat removed, the resulting temperature drop of the slurry per pass through the draft cooler varies between 0.005° C. to 0.15° C. and is typically about 0.009° C.

Therefore with the present invention installed, the temperature drop for a vessel may be up to a maximum of 5° C. but preferably would not be expected to exceed 3° C.

Table 1 illustrates the difference in vessel number and exit temperatures for a precipitation process utilising no external cooling, interstage cooling, and draft tube cooling of the configuration shown in FIG. 1.

TABLE 1

|  | No. Ext Cooling | +ISC | +DTC |
|---|---|---|---|
| Start Temp | 75.0 | 75.0 | 75.0 |
|  |  | ISC - 10° C. |  |
| Tank 1 | 74.5 | 65.0 | 72.0 |
| 2 | 74.0 | 64.5 | 69.0 |
| 3 | 73.5 | 64.0 | 66.0 |
| 4 | 73.0 | 63.5 | 63.0 |
| 5 | 72.5 | 63.0 | 60.0 |
|  |  | ISC - 6° C. |  |
| 6 | 72.0 | 57.0 | 57.0 |
| 7 | 71.5 | 56.5 | 55.0 |
| 8 | 71.0 | 56.0 |  |
| 9 | 70.5 | 55.5 |  |
| 10 | 70.0 | 55.0 |  |
| ↓ | ↓ |  |  |
| 20 | 65.0 |  |  |
| ↓ | ↓ |  |  |
| 30 | 60.0 |  |  |
| ↓ | ↓ |  |  |
| 40 | 55.0 |  |  |

FIG. 9 illustrates precipitation cooling curves for no external (A), interstage (b) and 2 rates of draft tube cooling (C1 and C2) and illustrates diagrammatically information shown in Table 1.

Thus it can be seen that by using the draft tube cooling, the total number of tanks required to reduce the temperature of the supersaturated or pregnant liquor by incremental cooling is reduced without any adverse effects on the precipitation process, specifically the fall in product quality caused by large cooling steps can be avoided.

As the pressure drop through the draft tube utilizing the present invention would be substantially the same as a vessel having no external cooling, no appreciable increase in power consumption of the draft means would be expected. Consequently, the circulation rate of the slurry through the draft tube can be maintained at the same rates as a vessel having no external cooling.

We claim:

1. An apparatus for cooling or heating a particulate suspension in a process vessel, said apparatus including:

a draft tube having a draft section and an elongate cylindrical section;

circulating means in said draft section for circulating said particulate suspension through said draft tube at a velocity sufficient to substantially maintain the particulate suspension in said process vessel, and heat exchange means in a substantial proportion of the length of said cylindrical section of said elongate cylindrical section of said draft tube, said heat exchange means comprising two or more plate heat exchangers positioned within the passage of flow of the particulate suspension in the draft tube said two or more plate heat exchangers being arranged in pairs, each plate heat exchanger of a respective pair extending in a direction that is substantially parallel to a direction of flow of said particulate suspension through said elongate cylindrical section of said draft tube, a plurality of pairs of plate heat exchangers being arranged in said passage of flow, said plurality of pairs of plate heat exchangers being spaced axially along the substantial length of said cylindrical section of said draft tube, lower edges of said plate heat exchangers of a pair of said plate heat exchangers being located substantially adjacent upper edges of said plate heat exchangers of a next downstream pair of plate heat exchangers, said axially spaced pairs of plate heat exchangers being successively arranged along the axis at right angles to a preceding pair.

2. The apparatus as claimed in claim 1 wherein said plate heat exchangers are connected in series.

* * * * *